Patented Mar. 17, 1936

2,034,668

UNITED STATES PATENT OFFICE 2,034,668

AZO DYESTUFFS

Hans Reindel, Ludwigshafen-on-the-Rhine, Hans Krzikalla, Mannheim, and Walter Limbacher, Ludwigshafen-on-the-Rhine, Germany, assignors to General Aniline Works, Inc., New York, N. Y., a corporation of Delaware No Drawing. Application March 22, 1932, Serial No. 600,561. In Germany March 26, 1931

14 Claims. (Cl. 260—79)

The present invention relates to new azo dyestuffs and process of producing the same.

We have found that valuable azo dyestuffs are obtained by coupling the diazo compound of an aromatic amine with a coupling component containing in its molecule an aliphatic radicle of at least 10 carbon atoms. Coupling components which may be used for the purpose of our invention, comprise amino and hydroxy derivatives of aromatic compounds containing the said aliphatic radicle attached directly to the nucleus, or by means of a linking member, for example an oxygen atom, or a

or a —SO₂—O— group and preferably by means of the imino group —NH— or the acylamino groups —NH—CO— or —NH—SO₂—. Suitable coupling components are, therefore, amino and hydroxy compounds of aralkyls, ethers, esters, imines and acylamines. Any kind of coupling components hitherto employed in the preparation of azo dyestuffs may be used provided they contain the said aliphatic radicle attached. Thus, also coupling components substituted by the most various kinds of substituents may be employed, for example they may contain halogen atoms or alkyl, alkoxy, aralkyl, nitro, carboxylic and, in particular, sulphonic acid groups. The said coupling components containing an aliphatic radicle of at least 10 carbon atoms may be prepared according to customary methods, for example by condensation of aromatic polyamines or amino hydroxy compounds with aliphatic acids containing the said number of carbon atoms or halides thereof, for example capric, lauric, myristic, palmitic, margaric, stearic, arachidic and like fatty acids, or unsaturated acids, such as oleic, erucic, elaidic, linoleic acid and the acids present in soja bean oil, or the halides, in particular the chlorides, of the said acids. Coupling components containing the aliphatic radicle attached by means of an oxygen atom may be prepared by condensation of aromatic hydroxy compounds with alcohols corresponding to the aforesaid acids which may be prepared by reduction of the acids. Other aliphatic alcohols containing the said number of carbon atoms may, of course, be used as well, for example cetyl alcohol. In a similar manner coupling components containing the aliphatic radicle attached by means of a carboxylic group are obtained by condensation of an aromatic amino- or hydroxy-carboxylic or sulphonic acid with the aforesaid alcohols. Imines may be prepared by condensation of aromatic amines with an alcohol containing at least 10 carbon atoms with the aid of hydrochloric acid as condensing agent. They may also be produced by condensing the alkyl chlorides corresponding to the aforesaid alcohols with aromatic amines.

On the other side the new azo dyestuffs can be derived from any diazo component hitherto employed, for example such as are obtained from mono- or poly-amino derivatives of aromatic compounds, for example such derived from benzene or naphthalene and its homologues, aralkyl, hydroxy, alkoxy, halogen, nitro, carboxylic and sulphonic acid derivatives. Further, there may be employed amino derivatives of diphenyl, benzophenone, diphenylsulphone, diphenyl urea, diphenyleneketone, carbazole, diphenylmethane, diphenylether, stilbene, azobenzene and many others and the aforesaid substitution products thereof. All azo dyestuffs prepared from the aforesaid components have distinct advantages over those hitherto known which reside in case of water-insoluble azo dyestuffs in their good solubility in organic solvents which makes them particularly suitable for coloring lacquers or artificial masses, such as celluloid and the like. The azo dyestuffs which are water-soluble due to the presence of sulphonic or carboxylic acid groups, are particularly suitable for dyeing in view of the good fastness to washing and fulling of the dyeings.

The following examples will further illustrate the nature of this invention but the invention is not restricted thereto. The parts are by weight.

Example 1

12.7 parts of meta-chloraniline are diazotized in the usual manner and coupled with 34 parts of the condensation product from lauric acid chloride and 1,8-aminonaphthol-4,6-disulphonic acid in a solution rendered alkaline with soda. A bluish red dyestuff is obtained which dyes wool very fast shades.

After having been laked with barium chloride, the dyestuff may also be employed as a lake dyestuff.

Example 2

17.3 parts of metanilic acid are diazotized in the usual manner and coupled with 61 parts of the condensation product from stearic acid chloride and 1,8-aminonaphthol-3,6-disulphonic acid in a solution rendered alkaline with soda. A dyestuff is obtained which dyes wool red shades fast to washing.

Example 3

30.3 parts of 1-naphthylamine-5,7-disulphonic acid are diazotized in the usual manner and introduced into an alkaline solution of 49 parts of para-aminostearic acid anilide of acetoacetic acid which may be obtained by the condensation of para-aminostearic acid anilide with acetoacetic ester. A dyestuff is obtained which dyes wool yellow orange shades fast to washing and fulling.

Example 4

28 parts of dodecylaniline are coupled in acid solution with 25.3 parts of diazotized 2,4-aniline disulphonic acid. A dyestuff is obtained which dyes wool intense yellow shades of very good fastness to washing and fulling.

Example 5

14.3 parts of α-naphthylamine are diazotized in the usual manner and coupled with 61 parts of the condensation product of oleic acid chloride and 1,8-aminonaphthol-3,6-disulphonic acid in a solution rendered alkaline with sodium carbonate. A dyestuff is obtained dyeing wool red violet shades of very good fastness to washing and fulling.

A bluish red dyeing product is obtained in the aforedescribed manner from diazotised aniline.

Example 6

24.4 parts of dianisidine are tetrazotized in the usual manner and coupled with 122 parts of the condensation product employed according to Example 5 in a solution rendered alkaline by means of sodium carbonate. A dyestuff is obtained dyeing wool from an acid bath blue shades of good fastness to washing and fulling. The fastness to light of the dyeings may be improved by treating the dyestuff in substance or in the dye-bath with copper salts.

Unsymmetrical diazo dyestuffs can of course be prepared from tetrazotized benzidine or dianisidine, these dyestuffs having the same good properties.

In the following table a number of diazo dyestuffs obtainable according to the present invention and their dyeing properties are described:

| Diazo component | First coupling component | Second coupling component | Shade of dyeing on wool |
| --- | --- | --- | --- |
| Dianisidine | Condensation product of oleic acid chloride with 1-amino-8-hydroxy-naphthalene-3,6-disulphonic acid | Condensation product of oleic acid chloride with 1-amino-8-hydroxy-naphthalene-3,6-disulphonic acid | Blue |
| Dianisidine | Condensation product of oleic acid chloride with 2-amino-8-hydroxy-naphthalene-6-sulphonic acid | Condensation product of oleic acid chloride with 2-amino-8-hydroxy-naphthalene-6-sulphonic acid | Blue violet |
| Dianisidine | Condensation product of oleic acid chloride with 1-amino-5-hydroxy-naphthalene-7-sulphonic acid | Condensation product of oleic acid chloride with 1-amino-5-hydroxy-naphthalene-7-sulphonic acid | Reddish blue |
| Dianisidine | Condensation product of stearic acid chloride with 1-amino-8-hydroxy-naphthalene-3,6-disulphonic acid | Condensation product of stearic acid chloride with 1-amino-8-hydroxy-naphthalene-3,6-disulphonic acid | Blue |
| Dianisidine | Condensation product of oleic acid chloride with 1-amino-8-hydroxy-naphthalene-3,6-disulphonic acid | Condensation product of oleic acid chloride with 2-amino-5-hydroxy-naphthalene-7-sulphonic acid | Blue |
| Dianisidine | Condensation product of oleic acid chloride with 1-amino-8-hydroxy-naphthalene-3,6-disulphonic acid | 2,5,7-aminonaphthol sulphonic acid | Reddish blue |
| Dianisidine | Condensation product of oleic acid chloride with 1-amino-8-hydroxy-naphthalene-3,6-disulphonic acid | 2-phenylimino-5-hydroxy-naphthalene-7-carboxylic acid | Reddish blue |
| Dianisidine | Condensation product of oleic acid chloride with 1-amino-8-hydroxy-naphthalene-3,6-disulphonic acid | 2,6-naphthol sulphonic acid | Blue |
| Dianisidine | Condensation product of oleic acid chloride with 1-amino-8-hydroxy-naphthalene-3,6-disulphonic acid | Condensation product salicylic-sulpho chloride and 2-methylimino-5-hydroxy-naphthalene-7-sulphonic acid | Reddish blue |
| Dianisidine | Condensation product of oleic acid chloride with 1-amino-8-hydroxy-naphthalene-3,6-disulphonic acid | 3-methyl-1-phenyl-5-pyrazolone prepared from 2'-amino-4''-hydroxy-diphenylsulphone-4', 3''-sulpho-carboxylic acid of the formula given at the end of the table | Reddish blue |
| Dianisidine | Condensation product of oleic acid chloride with 1-amino-8-hydroxy-naphthalene-3,6-disulphonic acid | 2,8-dihydroxy-naphthalene-6-sulphonic acid | Reddish blue |
| Dianisidine | Condensation product of oleic acid chloride with 1-amino-8-hydroxy-naphthalene-3,6-disulphonic acid | 1,4-naphtholsulphonic acid | Reddish blue |
| Dianisidine | Condensation product of oleic acid chloride with 1-amino-8-hydroxy-naphthalene-3,6-disulphonic acid | 3-methyl-1-phenyl-5-pyrazolone | Blue |
| Tolidine | Condensation product of oleic acid chloride with 1-amino-8-hydroxy-naphthalene-3,6-disulphoinc acid | Condensation product of oleic acid chloride with 1-amino-8-hydroxy-naphthalene-3,6-disulphonic acid | Reddish blue |
| Tolidine | Condensation product of oleic acid chloride with 1-amino-8-hydroxy-naphthalene-3,6-disulphonic acid | 2,6-naphtholsulphonic acid | Blue violet |
| Benzidine-o-disulphonic acid | Condensation product of oleic acid chloride with 2-amino-5-hydroxy-naphthalene-7-sulphonic acid. | Condensation product of oleic acid chloride with 2-amino-5-hydroxy-naphthalene-7-sulphonic acid. | Brick red. |
| Diamino-benzophenone | Condensation product of oleic acid chloride with 1-amino-8-hydroxy-naphthalene-3,6-disulphonic acid | Condensation product of oleic acid chloride with 1-amino-8-hydroxy-naphthalene-3,6-disulphonic acid | Reddish violet |
| Diamino-benzophenone | Condensation product of oleic acid chloride with 1-amino-8-hydroxy-naphthalene-3,6-disulphonic acid | 2,6-naphtholsulphonic acid | Red |
| Diamino-benzophenone | Condensation product of oleic acid chloride with 1-amino-8-hydroxy-naphthalene-3,6-disulphonic acid | 3-methyl-1-phenyl-5-pyrazolone | Red |
| Diamino-benzophenone | Condensation product of oleic acid chloride with 1-amino-8-hydroxy-naphthalene-3,6-disulphonic acid | 1-(p-sulphophenyl)-5-pyrazolone-3-carboxylic acid | Red |
| Diamino-benzophenone | Condensation product of oleic acid chloride with 1-amino-8-hydroxy-naphthalene-3,6-disulphonic acid | 1-(2'-hydroxy-3'-carboxy-5'-sulphophenyl)-3-methyl-5-pyrazolone | Red |
| Diamino-benzophenone | Condensation product of oleic acid chloride with 1-amino-8-hydroxynaphthalene-3,6-disulphonic acid. | 1-phenyl-5-pyrazolone-3-carboxylic acid | Red |
| Tolidine-m-disulphonic acid | Condensation product of oleic acid chloride with 2-amino-8-hydroxynaphthalene-6-sulphonic acid | Condensation product of oleic acid chloride with 2-amino-8-hydroxynaphthalene-6-sulphonic acid | Bluish red |
| Tolidine-m-disulphonic acid | Condensation product of oleic acid chloride with 2-amino-5-hydroxynaphthalene-7-sulphonic acid | Condensation product of oleic acid chloride with 2-amino-5-hydroxynaphthalene-7-sulphonic acid | Brick red |

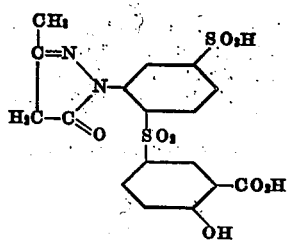

Example 7

37 parts of the monoazo dyestuffs from diazotized 1-naphthylamino-6-sulphonic acid and α-naphthylamine are diazotized in the usual manner in a hydrochloric acid solution by means of 7 parts of sodium nitrite and coupled with 62 parts of a solution of the condensation product described in Example 5 in a solution containing an excess of sodium carbonate. A dyestuff is obtained dyeing wool from an acetic acid bath fast blue violet shades.

A dyestuff of practically the same properties is obtained in the aforedescribed manner by replacing the said condensation product prepared by means of stearic chloride instead of oleic chloride, thus showing that the kind of the aliphatic radicle present, generally speaking, has no great influence on the shade of the dyestuff.

Example 8

35 parts of the monoazo dyestuff from diazotized 4-amino-1,3-xylene-5-sulphonic acid and 1-amino-2-methoxy-5-methyl-benzene are diazotized and coupled in a solution rendered alkaline with sodium carbonate with the condensation product of oleic acid 2-amino-5-hydroxynaphthalene-7-sulphonic acid. A dyestuff is obtained dyeing wool violet shades of good fastness properties.

Example 9

30 parts of 5-amino-2-benzoylamino-1,4-hydroquinone-diethyl ether are diazotized and coupled with 62 parts of the condensation product described in Example 5. A dyestuff is obtained dyeing wool very fast clear greenish blue shades.

The dyestuff obtained in an analogous manner when using diazotized 3-amino-4-methoxy-6-benzoylamino-1-methyl benzene as diazo component is very similar to the aforedescribed dyestuff but yields more reddish shades.

Example 10

25.2 parts of diazotized 2,4-aniline disulphonic acid are coupled in an alkaline solution with 40 parts of 2-hydronaphthalene-6-sulpho-dodecylamide. A dyestuff is obtained dyeing wool red shades of good fastness to washing and fulling.

Example 11

30.1 parts of 1,3,6-naphthylamine disulphonic acid are diazotized in the usual manner and coupled with 32 parts of 4-methyl-3-laurylamidophenol in pyridine rendered alkaline. A dyestuff is obtained dyeing wool orange shades of very good fastness properties.

Example 12

17.2 parts of metanilic acid are diazotized and coupled in an alkaline solution with about 32 parts of 1,4-naphthohydroquinonemonodecyl ether. A blue red dyeing dyestuff is thus obtained.

Example 13

20.4 parts of para-aminosulphosalicylic acid (COOH:OH:NH$_2$:SO$_3$H=1:2:5:3) are diazotized and coupled with 39 parts of the dodecyl ester of 2,3-hydroxynaphthoic acid in an alkaline solution. The dyestuff thus obtained dyes wool fast red shades which may still be improved as regards fastness to light by after-chroming.

Example 14

9.3 parts of aniline are diazotized and coupled in a solution containing pyridine with 40 parts of 1-hydroxynaphthalene-4-sulphododecylamide. A red dyestuff is obtained which is readily soluble in organic solvents.

What we claim is:—

1. Azo dyestuffs corresponding to the general formula $$Y-R-N=N-R'-X$$

in which R stands for an aromatic radicle, R' for the radicle of a coupling component containing a benzene or naphthalene nucleus, X for an aliphatic radicle containing at least 10 carbon atoms which is attached to R' either directly or by means of a linking member selected from the group consisting of

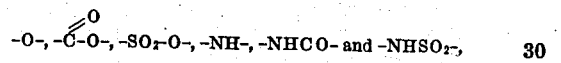

and Y stands for hydrogen or for the group R''—N=N—, wherein R'' is a benzene or naphthalene radicle, said dyestuffs containing at least one substituent selected from the class consisting of the carboxylic and sulphonic acid groups and being obtainable by coupling an aromatic component containing at least one diazo group with a coupling component containing a benzene or a naphthalene nucleus and the said aliphatic radicle attached thereto, at least one of the said components containing at least one substituent selected from the class consisting of the sulphonic and carboxylic acid groups.

2. Azo dyestuffs corresponding to the general formula $$R-N=N-R'-X$$

in which R stands for an aromatic radicle, R' for the radicle of a coupling component containing a benzene or naphthalene nucleus and X for an aliphatic radicle containing at least 10 carbon atoms which is attached to R' either directly or by means of a linking member selected from the group consisting of

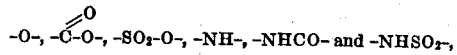

the said dyestuffs containing at least one substituent selected from the class consisting of the carboxylic and sulphonic acid group and being obtainable by coupling a diazotized aromatic amine with a coupling component of the benzene or naphthalene series containing the said aliphatic radicle attached thereto, at least one of the said components containing at least one substituent selected from the class consisting of the carboxylic and sulphonic acid groups.

3. Azo dyestuffs corresponding to the general formula:

$$R-N=N-R'-X$$

in which R stands for an aromatic radicle, R' for a naphthalene radicle and X for an aliphatic radicle containing at least 10 carbon atoms which is attached to R' either directly or by means of a linking member selected from the group consisting of

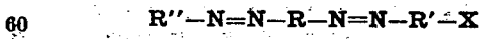

the said dyestuffs containing at least one substituent selected from the class consisting of the carboxylic and sulphonic acid groups and being obtained by coupling a diazotized aromatic amine with a naphthalene coupling component containing the said aliphatic radicle attached thereto, at least one of the said components containing at least one substituent selected from the class consisting of the carboxylic and sulphonic acid groups.

4. Azo dyestuffs corresponding to the general formula:

$$R-N=N-R'-X$$

in which R stands for an aromatic radicle, R' for a naphthol radicle and X for an aliphatic radicle containing at least 10 carbon atoms which is attached to R' either directly or by means of a linking member selected from the group consisting of

the said dyestuffs containing at least one substituent selected from the class consisting of the carboxylic and sulphonic acid groups and being obtained by coupling a diazotized aromatic amine with a naphthol coupling component containing the said aliphatic radicle attached thereto, at least one of the said components containing at least one substituent selected from the class consisting of the carboxylic and sulphonic acid groups.

5. Azo dyestuffs corresponding to the general formula:

$$R-N=N-R'-X$$

in which R stands for an aromatic radicle, R' for a naphthol sulphonic acid radicle and X for an aliphatic radicle containing at least 10 carbon atoms which is attached to R' either directly or by means of a linking member selected from the group consisting of

the said dyestuffs containing at least one substituent selected from the class consisting of the carboxylic and sulphonic acid groups and being obtained by coupling a diazotized aromatic amine with a naphthol sulphonic acid coupling component containing the said aliphatic radicle attached thereto.

6. Azo dyestuffs corresponding to the general formula:

$$R''-N=N-R-N=N-R'-X$$

in which R stands for a diphenyl radicle, R' for a naphthol radicle, X for an aliphatic radicle containing at least 10 carbon atoms which is attached to R' either directly or by means of a linking member selected from the group consisting of

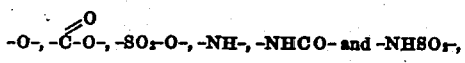

and R'' for an aromatic radicle, the said dyestuffs containing at least one substituent selected from the class consisting of the carboxylic and sulphonic acid groups and being obtained by coupling a tetrazotized benzidine with an aromatic coupling component and a naphthol coupling component containing the said aliphatic radicle attached thereto, at least one of the said components containing at least one substituent selected from the class consisting of the carboxylic and sulphonic acid groups.

7. Azo dyestuffs corresponding to the general formula:

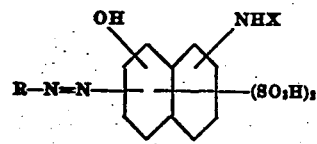

wherein R stands for the radicle of a diazotized aromatic amine and X represents an aliphatic acyl radicle containing at least 10 carbon atoms.

8. Azo dyestuffs corresponding to the general formula:

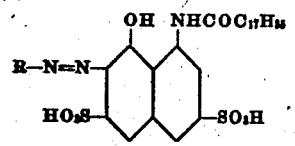

wherein R stands for the radicle of a diazotized aromatic amine.

9. Water-soluble azo dyestuffs corresponding to the general formula $$R-N=N-R'-X$$

in which R stands for the radical of a diazotized aromatic amine, R' for a benzene or a naphthalene radical, and X for an aliphatic radical containing at least 10 carbon atoms, said dyestuffs containing a group selected from the class consisting of sulfonic and carboxylic acid groups.

10. Azo dyestuffs corresponding to the general formula $$R-N=N-R'-X$$

in which R stands for the radical of a diazotized aromatic amine, R' for a benzene or a naphthalene radical, and X for an aliphatic radical containing at least 10 carbon atoms, said dyestuffs containing a group selected from the class consisting of sulfonic and carboxylic acid groups in the radical R'.

11. Water-soluble azo dyestuffs corresponding to the general formula $$R-N=N-R'-X$$

in which R stands for the radical of a diazotized aromatic amine, R' for a benzene or naphthalene radical and X for an aliphatic radical containing at least 10 carbon atoms, which is attached to R' by a group selected from the class consisting of

said dyestuffs containing a group selected from the class consisting of sulfonic and carboxylic acid groups.

12. Azo dyestuffs corresponding to the general formula $$R-N=N-R'-X$$

in which R stands for the radical of a diazotized aromatic amine, R' for a benzene or naphthalene radical and X for an aliphatic radical containing at least 10 carbon atoms, which is attached to R' by a group selected from the class consisting of —O—, —C(=O)—O—, —SO$_2$—O—, —NH—, —NHCO— and —NHSO$_2$—, said dyestuffs containing a group selected from the class consisting of sulfonic and carboxylic acid groups in the radical R'.

13. A water-soluble azo dyestuff comprising an aromatic diazo component coupled to a coupling component consisting of 1,8-amino naphthol-3,6-disulfonic acid having an H atom in the amino group substituted by an aliphatic acyl radical containing at least 10 carbon atoms.

14. Azo dyestuffs corresponding to the general formula:

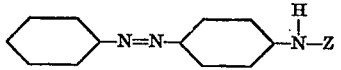

wherein Z represents an alkyl radicle containing at least 10 carbon atoms, said dyestuffs being sulfonated to increase their water solubility.

HANS REINDEL.
HANS KRZIKALLA.
WALTER LIMBACHER.